US012682137B2

(12) United States Patent
Ibañez Martinez et al.

(10) Patent No.: US 12,682,137 B2
(45) Date of Patent: Jul. 14, 2026

(54) COMPUTER IMPLEMENTED METHOD FOR MANIPULATING A NUMERICAL MODEL OF A 3D DOMAIN

(71) Applicants: Repsol, S.A., Madrid (ES); PETRABYTES CORPORATION, Bellaire, TX (US)

(72) Inventors: Enric Ibañez Martinez, Móstoles (ES); Pablo Enrique Vargas Mendoza, Móstoles (ES); Sashi B. Gunturu, Bellaire, TX (US); Daniel H. Morgan, Bellaire, TX (US)

(73) Assignees: Repsol, S.A., Madrid (ES); Petrabytes Corporation, Bellaire, TX (US)

( * ) Notice: Subject to any disclaimer, the term of this patent is extended or adjusted under 35 U.S.C. 154(b) by 96 days.

(21) Appl. No.: 16/643,050

(22) PCT Filed: Aug. 28, 2018

(86) PCT No.: PCT/EP2018/073074
§ 371 (c)(1),
(2) Date: Feb. 28, 2020

(87) PCT Pub. No.: WO2019/042960
PCT Pub. Date: Mar. 7, 2019

(65) Prior Publication Data
US 2020/0334404 A1     Oct. 22, 2020

(30) Foreign Application Priority Data
Aug. 29, 2017     (EP) ..................................... 17382586

(51) Int. Cl.
*G06F 30/23*          (2020.01)
*G06F 16/21*          (2019.01)
(Continued)

(52) U.S. Cl.
CPC ............ *G06F 30/23* (2020.01); *G06F 16/211* (2019.01); *G06F 16/22* (2019.01); *G06F 16/29* (2019.01);
(Continued)

(58) Field of Classification Search
CPC ...... G06F 30/23; G06F 2111/10; G06F 16/29; G06T 17/205; G06T 19/20; G06T 2210/21
See application file for complete search history.

(56) References Cited

U.S. PATENT DOCUMENTS 6,014,614 A * 1/2000 Herring .............. G06K 9/00476
                                                                  702/196
6,128,577 A * 10/2000 Assa ....................... G06F 16/29
                                                                  702/2
(Continued)

FOREIGN PATENT DOCUMENTS

CN          103164440 A * 6/2013
CN          104199986 A * 12/2014

OTHER PUBLICATIONS

Ji, Changqing, Zhiyang Li, Wenyu Qu, Yujie Xu, and Yuanyuan Li. "Scalable nearest neighbor query processing based on inverted grid index." (Elsevier, 2014) Journal of Network and Computer Applications 44: 172-182. <http://dx.doi.org/10.1016/j.jnca.2014.05.010> (Year: 2014).*
(Continued)

*Primary Examiner* — Emerson C Puente
(74) *Attorney, Agent, or Firm* — Reising Ethington P.C.

(57) ABSTRACT
A computer implemented method for manipulating a numerical model of a 3D domain, the numerical model includes a plurality of geometrical entities. The method provides a set of specific lists of indexing keys increasing the
(Continued)

speed of access including writing and reading operations for one or more geometrical entities.

11 Claims, 8 Drawing Sheets

(51) Int. Cl.

| | | |
|---|---|---|
| *G06F 16/22* | (2019.01) | |
| *G06F 16/29* | (2019.01) | |
| *G06T 17/20* | (2006.01) | |
| *G06T 19/20* | (2011.01) | |
| *G06F 111/10* | (2020.01) | |

(52) U.S. Cl.
CPC ............ *G06T 17/205* (2013.01); *G06T 19/20* (2013.01); *G06F 2111/10* (2020.01); *G06T 2210/21* (2013.01)

(56) References Cited

U.S. PATENT DOCUMENTS

| | | | | |
|---|---|---|---|---|
| 9,922,142 | B2 * | 3/2018 | Dachang ............... | G01V 11/00 |
| 10,311,088 | B1 * | 6/2019 | Fowler ................ | G06F 16/2462 |
| 10,429,545 | B2 * | 10/2019 | Ramsay ............... | G01V 99/005 |
| 2005/0120013 | A1 * | 6/2005 | Chang .................... | G06F 16/29 |
| 2007/0168169 | A1 | 7/2007 | Neave | |
| 2011/0202539 | A1 * | 8/2011 | Salemann ............... | G06F 16/29 |
| | | | | 707/741 |
| 2012/0036124 | A1 | 2/2012 | Gamet et al. | |
| 2013/0218539 | A1 * | 8/2013 | Souche ................... | G06F 30/20 |
| | | | | 703/2 |
| 2014/0136510 | A1 | 5/2014 | Parkkinen et al. | |
| 2015/0356088 | A1 * | 12/2015 | Berkhin .................. | G06F 16/29 |
| | | | | 707/769 |

OTHER PUBLICATIONS

Yu, Zhiwen. "GPCD: Grid-based predictive collision detection for large-scale environments in computer games." (IEEE, 2006) In 2006 IEEE International Conference on Multimedia and Expo, pp. 1025-1028. DOI: 10.1109/ICME.2006.262708 (Year: 2006).*

Grinberg, Ilan, and Yair Wiseman. "Scalable parallel collision detection simulation." (ACTA Press, 2007) SIP '07: Proceedings of the Ninth IASTED International Conference on Signal and Image Processing, vol. 7, pp. 380-385. (Year: 2007).*

Neteler, Markus, and Helena Mitasova. Open source GIS: a GRASS GIS approach. (Springer Science & Business Media, 2005) pp. 7-9, 87-88, 99-101. Print ISBN: 1-4020-8064-6 (Year: 2005).*

Fu, Yu-Chen, Zhi-Yong Hu, Wei Guo, and Dong-Ru Zhou. "QR-tree: a hybrid spatial index structure." (IEEE, 2003). In Proceedings of the 2003 International Conference on Machine Learning and Cybernetics (IEEE Cat. No. 03EX693), vol. 1, pp. 459-463. (Year: 2003).*

Pick, James B., et al. Geographic information systems in business. (Idea Group Publishing 2005). "Chapter V: Spatial Data Repositories: Design, Implementation and Management Issues by Julian Ray". pp. 84-102. ISBN 1-59140-401-0. (Year: 2005).*

Cova, Thomas J., and Michael F. Goodchild. "Extending geographical representation to include fields of spatial objects." International Journal of geographical information science 16, No. 6 (2002): 509-532. (Year: 2002).*

Breitfelder, Kim, and Don Messina. "IEEE 100: the authoritative dictionary of IEEE standards terms." Standards Information Network IEEE Press. v879 (2000). pp. 1-11, 545-546, 627, 750, 864. (Year: 2000).*

Codd, Edgar F. "A relational model of data for large shared data banks." Communications of the ACM 13, No. 6 (1970): 377-387. (Year: 1970).*

International Search Report for International Application No. PCT/EP2018/073074 dated Nov. 27, 2018, 4 pages.

Lin BI et al., "Database-oriented storage based on LMDB and linear octree for massive block model," ScienceDirect, Transactions of Nonferrous Metals Society of China 26, Jun. 12, 2016, pp. 2462-2468.

Benjamin Nakaten et al., "Virtual elements for representation of faults, cracks and hydraulic fractures in dynamic flow simulations" ScienceDirect, Energy Procedia 40 (2013), pp. 447-453.

\* cited by examiner

COMPUTER IMPLEMENTED METHOD FOR MANIPULATING A NUMERICAL MODEL OF A 3D DOMAIN

RELATED APPLICATION

This application is the National Stage of International Patent Application No. PCT/EP2018/073074, filed on Aug. 28, 2018.

FIELD OF THE INVENTION

The present invention is related to a computer implemented method for manipulating a numerical model of a 3D domain, preferably a geological 3D domain, said numerical model comprising geometrical entities such as geobodies, layers, fractures, discontinuities, volumes and well trajectories, etc., being identified as geometrical entities because they can be defined by its shape. The term "Geobody", an specific embodiment of a geometrical entity, is interpreted as a 2D or a 3D object that contains cells (or voxels) that have similar attributes or properties. The resulting data storage is very large.

The management of such large data storage, identified as a data storage block, may be unaffordable as simple operations over one or more geometrical entities require the processing of the entire data storage block. The data storage block, in a preferred embodiment, is a database.

The method provides an efficient management of the data storage block by a set of specific lists of indexing keys increasing the speed of access, for instance for writing and reading operations, for one or more determined geometrical entities.

PRIOR ART

One of the technical fields with a more intensive development is the modeling of geophysical domains wherein a predetermined domain comprises information regarding a plurality of aspects related to the geophysical properties and/or entities located within the domain that are relevant when assessing the behavior of the geophysical domain.

The geophysical domain is a physical entity being represented by a numerical model that may be instantiated by means of data structures according to the nature of the information.

These numerical models allow the simulation of the geomechanical structures such as facies, rocks, stratified layers; and, they also allow the simulation of fluid flow sub-models being located in the same domain.

These simulations allow predicting the evolution of the geophysical domain, for instance an oil or gas reservoir, when deploying a development plan for the exploitation of the reservoir.

These simulations are based on numerical models comprising geometrical entities such as fractures, geomaterials, and also properties of the 3D domain. Non-efficient data structures may result in unaffordable executions of the simulation algorithms.

These data structures are not only used when simulating the geophysical domain, more simple operations such as displaying the numerical model or preprocessing steps require operations such as zooming, selecting one or more entities or providing properties to one or more of said entities. Any of these operations require identifying a predetermined record storing the geometrical entity within the entire data storage block storing the numerical model for reading or writing data.

For instance, when selecting a specific fracture in a numerical model, the fracture is a geometrical entity being stored in a data storage block with its properties, in particular the coordinates of said fracture or any part of it.

The irregular shape of the geometrical entity prevents the use of structured indexes or any other tools facilitating the indexing of the geometrical entities and the fast access to the record. All records of the data storage block must be read until the entity is found. Even if the data storage block is stored by using efficient access data structures such as tree or octree structures, all records of the data storage block must be tracked taking even hours to handle a single operation using powerful computers. A geological volume and the geometries that describe it can number in many millions of distinct objects. Attempting to relate any geographical object with another often results in a data search that is computationally very costly.

The present invention provides a very efficient data structure and method allowing a fast management of the data storage block, retrieving, searching, and visualizing the entities of the numerical model for handling one or more entities overcoming the drawbacks of the prior art.

DESCRIPTION OF THE INVENTION

The present invention is a computer implemented method fray manipulating ca numerical model of a 3D domain, the numerical model comprising a plurality of geometrical entities wherein said geometrical entities at least comprises:
- a first index key identifying the geometrical entity,
- coordinates of the location of the geometrical entity or coordinates of the locations of part of the geometrical entity;

wherein the plurality of geometrical entities is stored in a data storage block, each geometrical entity being accessible by means of the first index key.

The numerical model represents the geological 3D domain, for instance a reservoir, and comprises entities such as fractures, wells or layers of the geophysical domain. These geometrical entities are stored in a data storage block and each of them is identified by the first index key. The domain is the region of the space where any of the variables, coordinates or properties of the numerical model is defined.

The data storage block allows a direct access to the record storing the geometrical entity by the first index key. Once the geometrical entity is accessed, any of the fields of the record are available. This is the case of the coordinates of the location of the geometrical entity or coordinates of the locations of part of the geometrical entity, along with any physical attributes that may be assigned.

The geometrical entity may be represented by points, curves, surfaces or volumes. If the geometrical entity is a point, the coordinates of the point are the coordinates of the geometrical entity, In any other case the geometrical entity may use a plurality of relevant points being part of the geometrical entity such as a corner or the center of mass or a vertex.

The method according to a first aspect of the invention, determines a grid comprising cells, said grid discretizing at least an space including the domain of the numerical model wherein for each cell a list of first records associated to the cell, the first records comprising at least a second index key, is generated wherein:

the list comprises a first record for each geometrical entity having at least the coordinates of the location of the geometrical entity or the coordinates of the locations of part of the geometrical entity located within the cell and, the second index key of each first record stores the first index key of the associated geometrical entity.

The grid may he determined mathematically, that is, there is no need of generating and storing a data structure for the grid. The space where the grid is defined contains the domain of the numerical model; therefore, said domain is totally discretized by the grid. Each point of the space of the numerical model is then associated to a cell cf the grid.

Any geometrical entity may be completely contained within a single cell of the grid or may be housed in a plurality of cells.

Additionally, any cell may contain or house one or more geometrical entities or parts of geometrical entities, being this condition also expressed as the coordinates of the geometrical entity or part of the geometrical entity is located within the cell. An alternative for expressing that a predetermined cell contains or houses a geometrical entity is the geometrical entity belongs to the cell and, an alternative for expressing that a predetermined cell partially contains or partially houses a geometrical entity is the geometrical entity partially belongs to the cell. Any of the three expressions using the terms "housing" or "belonging" or the long expression "the location of the coordinates of the geometrical entity is located within the cell" will be equivalent, with and without the adjective "partially" or the expression "part of".

The invention generates a list per cell comprising an identification of the geometrical entities being housed or partially housed in said cell. The list comprises a first record for each geometrical entity having a least the coordinates of the location of the geometrical entity or the locations of part of the geometrical entity located within the cell.

According to an embodiment, the first record may be implemented as a register; that is, a set of data not necessarily homogeneous, said register at least comprising a second index key field.

The second index key of each first record stores the first index key of the associated geometrical entity; that is, said second index key allows to directly accessing the geometrical entity, being understood as the record or register comprising the data of the geometrical entity, within the data storage block.

In a preferred embodiment, the grid is a structured grid, allowing indexing the cells using an index per dimension of the space. For instance, the set of cells defined by an structured grid in a 3D space may be represented by a variable G used as G[i,j,k], being j and k the three indexes, each index referring to a coordinate of the three-dimensional space.

In a preferred embodiment, the grid is a Cartesian structured grid. In this case, the mathematical expression of the grid may be determined just by defining a set of samples in each dimension for the discretization of the space in the associated coordinate.

The method of generating a list per cell requires processing the entire data storage block but it is done only once. Once the lists have been generated the management of a predetermined region of the geophysical domain limits the space to those cells comprising said region and, the list of each cell allows a fast access to the geometrical entities being pointed by the second index key of each first record as said second index key contains the first index key allowing the direct access in the data storage block.

A second aspect of the invention is a computer program product comprising instructions which, when the program is executed by a computer, cause the computer to perform a method according to the disclosed invention and according to any of the embodiments that will be disclosed in the detailed description of the invention.

A third aspect of the invention is a data structure comprising:

a data storage block comprising a plurality of geometrical entities of a numerical model wherein said geometrical entities at least comprise:

a first index key identifying the geometrical entity, coordinates of the location of the geometrical entity or coordinates of the locations of part of the geometrical entity;

a set of lists, each list comprising at least one second key identifying Geometrical entities of the data storage block wherein each first index key is at least stored in a second key of at least one list.

This data structure, when it is instantiated in a computer provides a fast access to any entity of the numerical model speeding up the management of the numerical model in the same computer comprising the data storage block.

Specific embodiments of the method and the data structure are disclosed in the detailed description of the invention.

DESCRIPTION OF THE DRAWINGS

These and other features and advantages of the invention will be seen more clearly from the following detailed description of a preferred embodiment provided only by way of illustrative and non-limiting example in reference to the attached drawings.

DETAILED DESCRIPTION OF THE INVENTION

Figure 1:
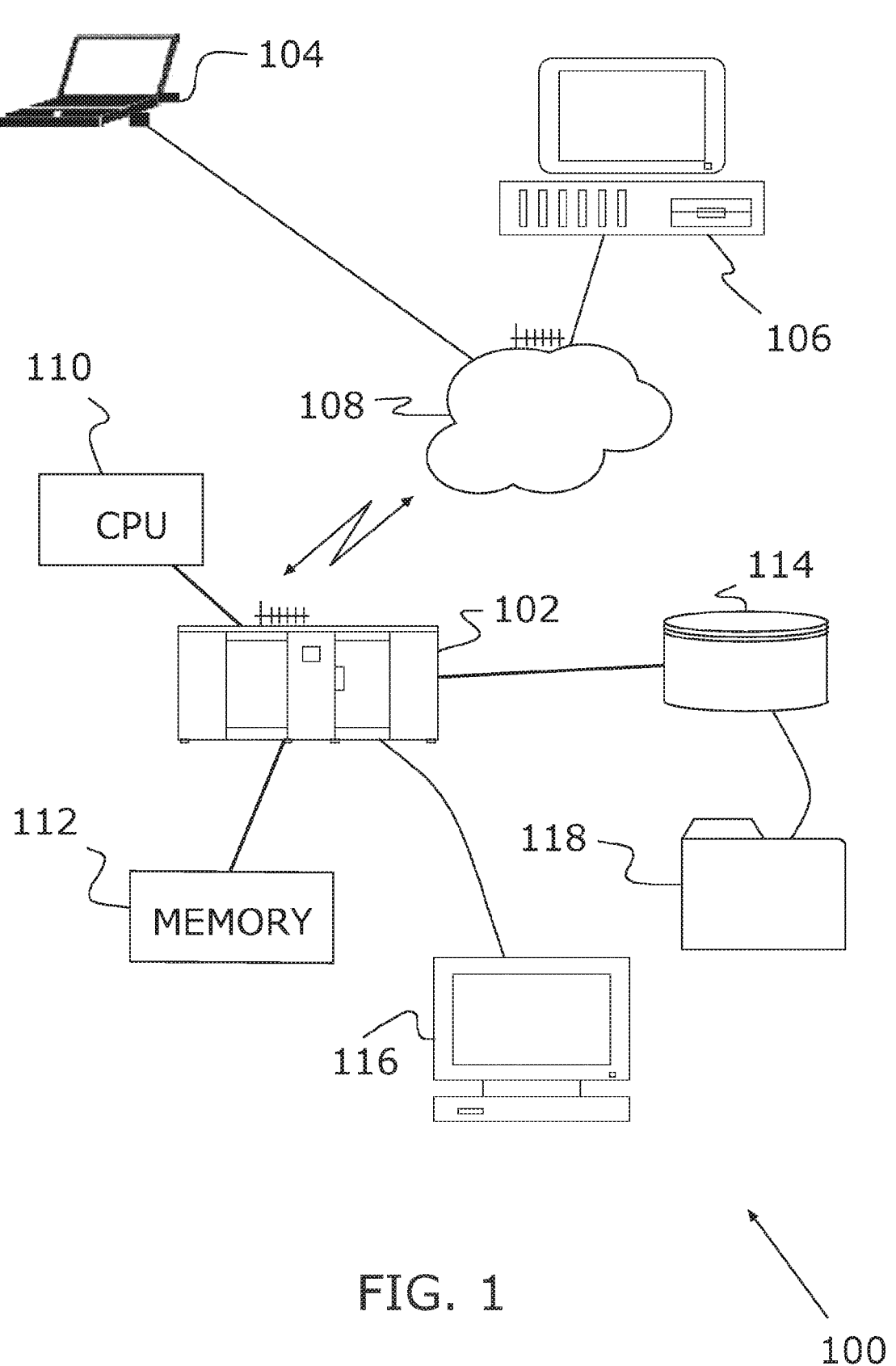
FIG. 1 This figure shows a data processing system for carrying out a method according to the invention.

As will be appreciated by one skilled in the art, aspects of the present invention may be embodied as a system, a method or a computer program product, Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (RUM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to illustrations and/or diagrams of methods, apparatus (systems) and computer program products according to embodiments of the invention, It will be understood that each illustration can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the drawings and more particularly, FIG. 1 shows an example of a system 100 for determining a field development plan (FDP) departing from field data, analog data or both, according to a preferred embodiment of the present invention.

An embodiment of system 100 determines a field development plan (FDP) in an efficient manner simulating in a specific manner proposed development plans comprising the sequential process of drilling and taking an observation of the reservoir at the location of the drill. Said observation is carried out by means of a module configured to generate geo-statistical models from field data, analog data or both, in particular from data determined in previous observations.

An embodiment of computing system 100 includes one or more computers 102, 104, 106 (3 in this example), coupled together, e.g., wired or wirelessly over a network 108. The network 108 may be, for example, a local area network (LAN), the Internet, an intranet or a combination thereof. Typically, the computers 102, 104, 106 include one or more processors, e.g., central processing unit (CPU) 110, memory 112, local storage 114 and some form of input/output device 116 providing a user interface. The local storage 114 may generate and/or include the data storage block (DB) 118 storing the numerical model (M) being accessible by the plurality of computers 102, 104, 106, for example processing in parallel the same numerical model.

Figure 2:
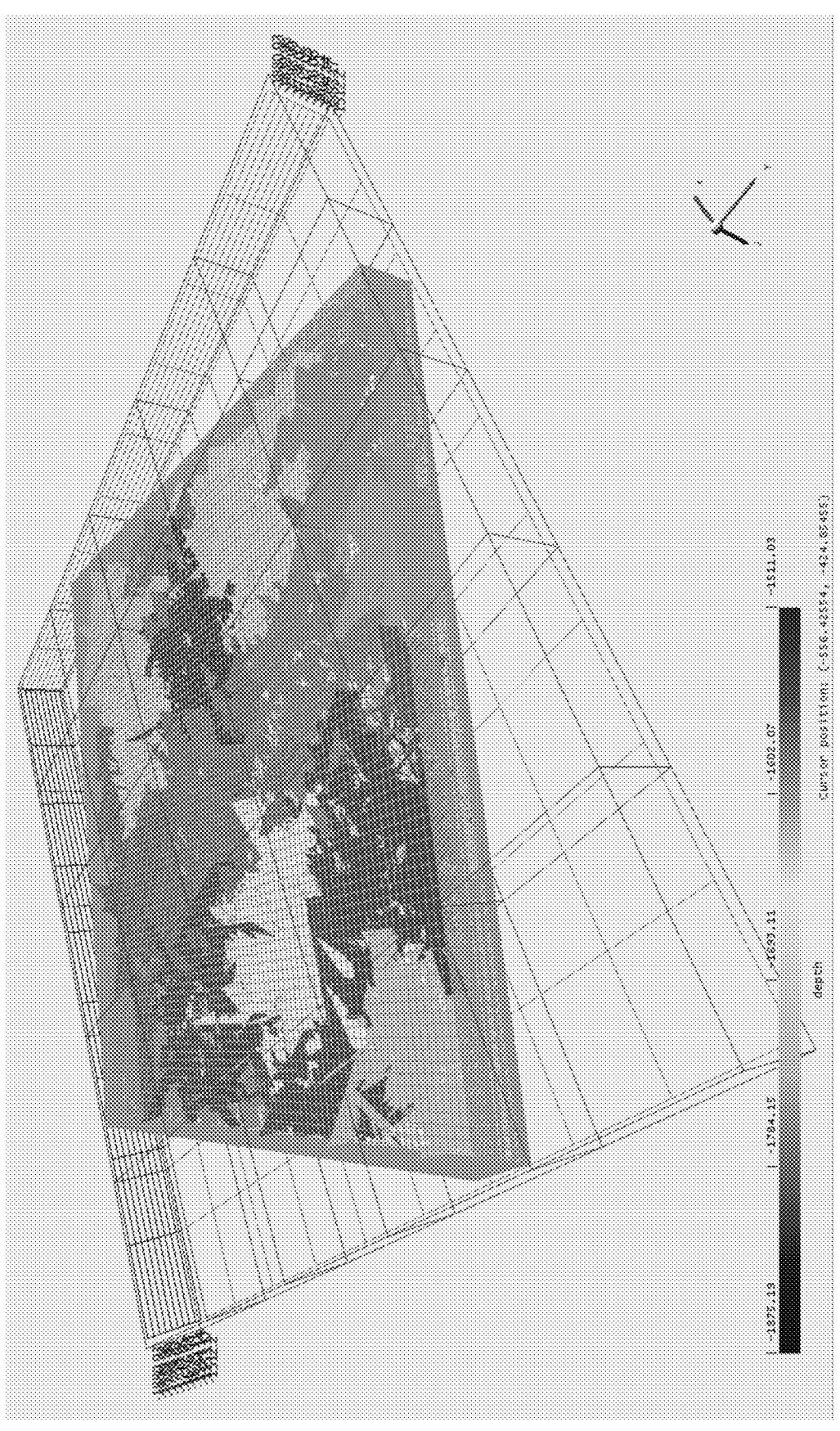
FIG. 2 This figure shows a perspective of a numerical model of a 3D domain bounded in its upper surface by the surface of a reservoir, by four lateral planes and a bottom horizontal plane. This figure shows some auxiliary lines for showing the depth dimension. The numerical model shows a plurality of geometrical entities identified by using different gray colors.

According to an embodiment, the numerical model ($\Omega$) represents a reservoir being the 3D domain as shown in FIG. 2 limited by four lateral planes and a bottom horizontal plane. The upper surface of the domain is in many cases the upper surface of the reservoir.

FIG. 2 also shows some auxiliary lines for allowing to display the numerical model and measuring the depth and distances on the graphical display.

Figure 3:
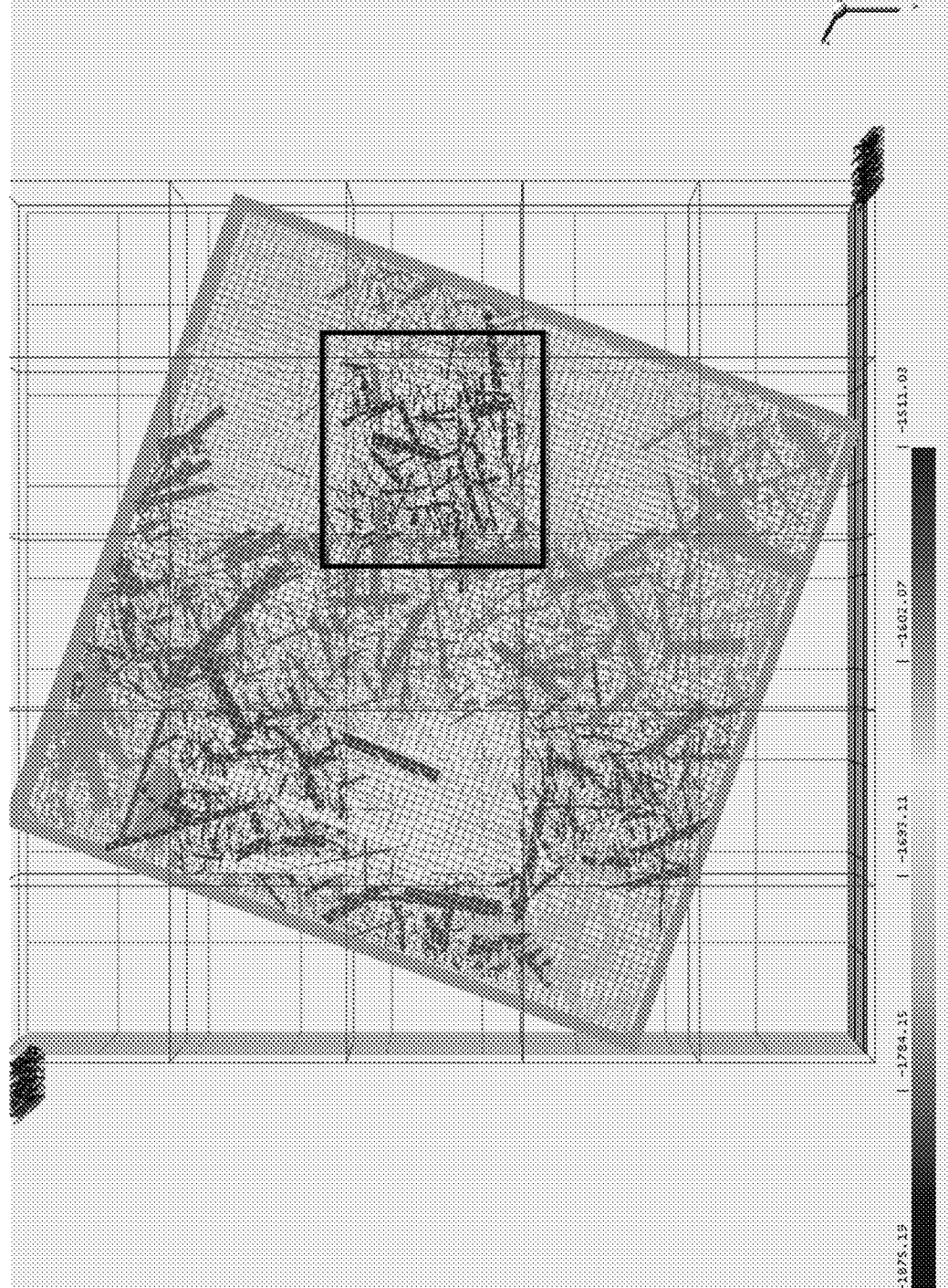
FIGS. 3, 4 FIG. 3 shows a plan view of the same numerical model and a rectangle being enlarged in FIG. 4. The combination of the two figures helps for identifying the very large number of entities being represented in a numerical model.

The 3D domain (Ω) comprises a very large of geometrical entities (E) shown by using different gray colors. Letter (E) is not used in this large scale views, this is why some enlarged views are also used in this description, FIG. 3 shows the same 3D domain (Ω) in a plan view with a rectangle over imposed on the graphical representation. This rectangle identifies the projected area of the volume being expanded in FIG. 4.

Figure 4:
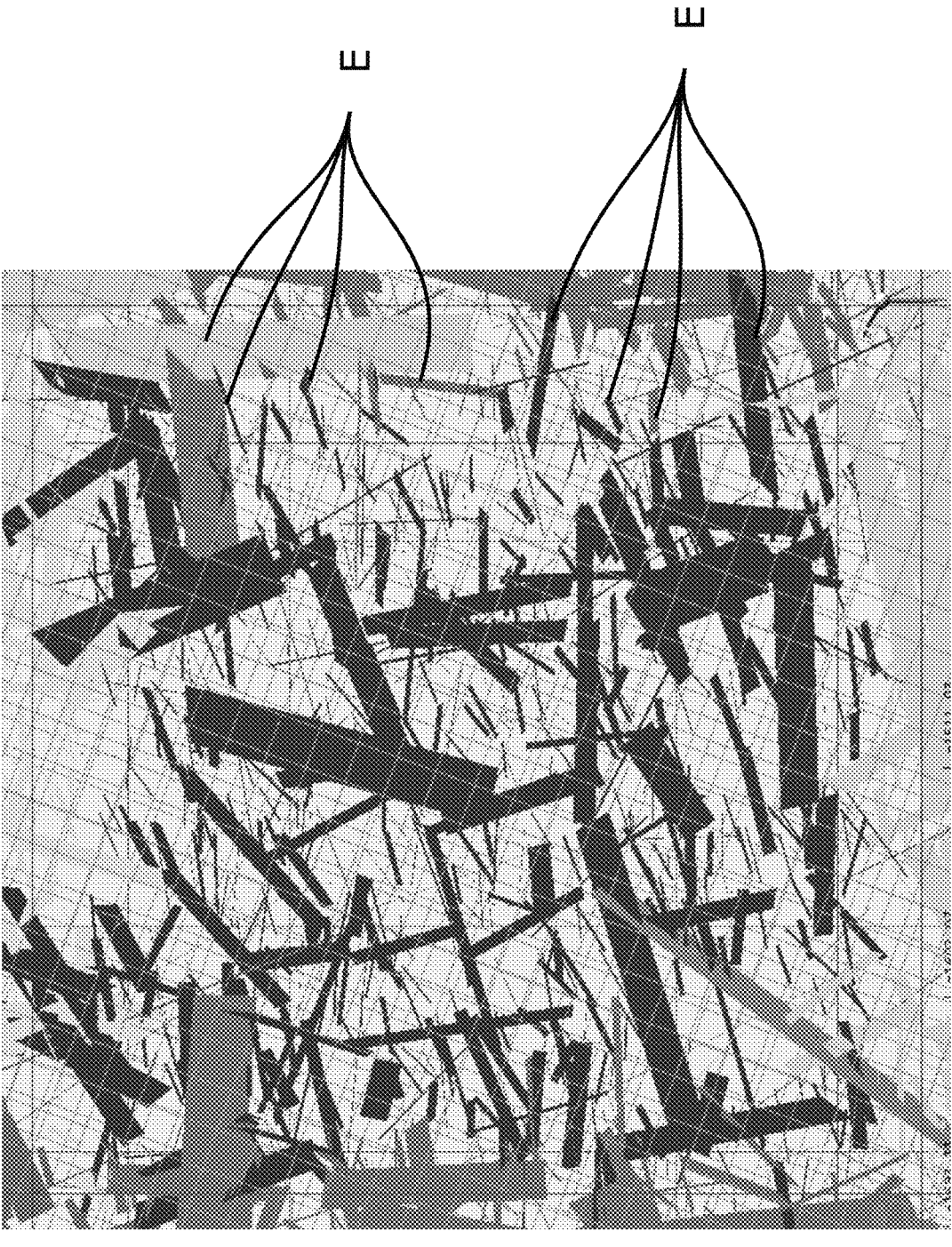

FIG. 4 is an enlarged view of the rectangle shown in FIG. 3 wherein fracture planes and fracture lines are geometrical entities (E) clearly shown. These geometrical entities (E) have a plurality of relevant points such as the vertex of the polygonal plane fractures. The center of mass or the vertex of the geometrical entities (E) are defined by its coordinates, being the coordinates fields of the records storing geometrical entities (E) in the data storage block (DB).

In this embodiments, the term "record" is being identified as a "register" or "structure" in the sense of Pascal or "C" language respectively in the sense of a package of data that may comprise non-homogeneous predefined data such as integers, arrays representing coordinates, real values representing properties or even pointers to length variable data structures like lists.

Figure 5:
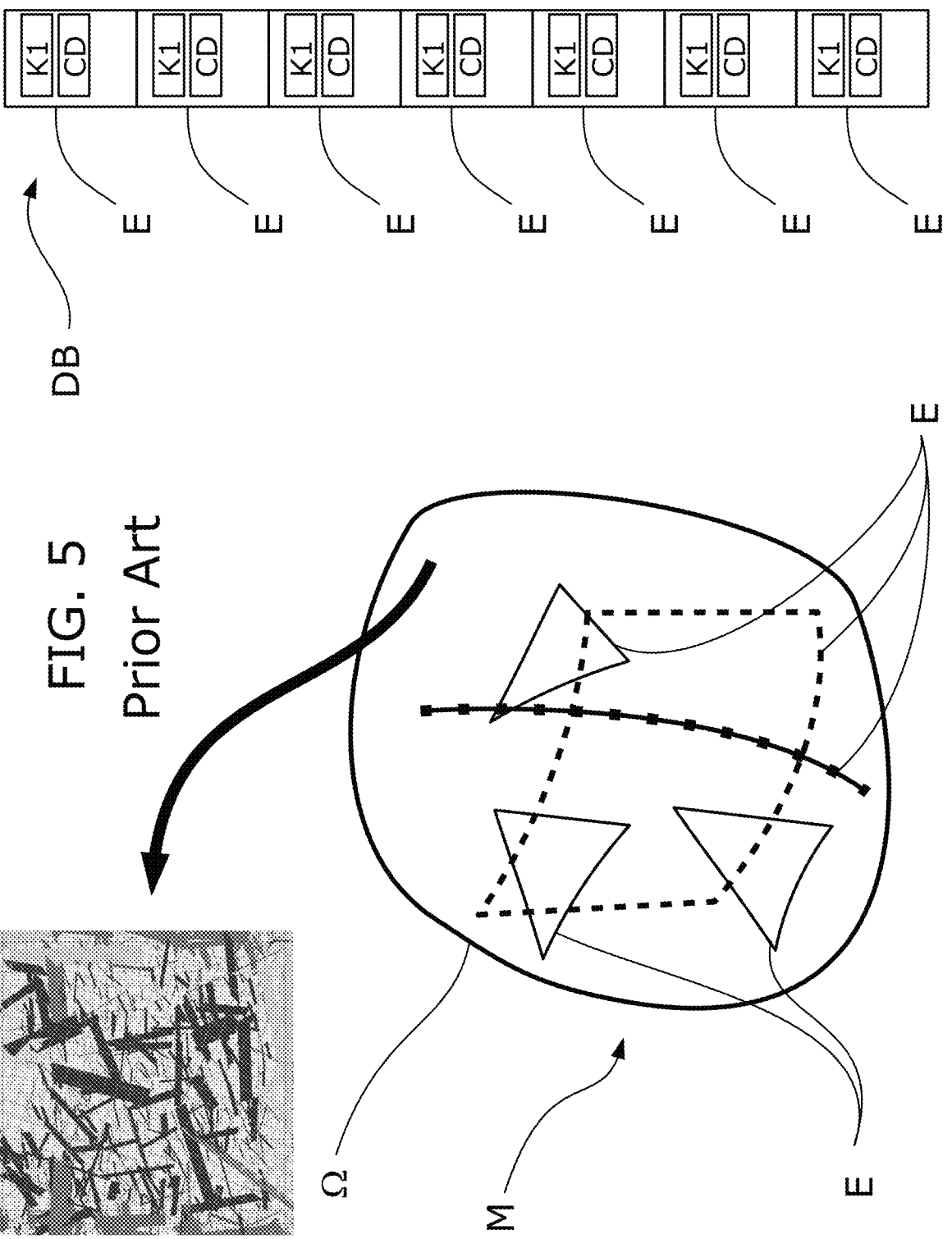
FIG. 5 This figure shows a schematic representation of the prior art wherein a numerical model comprising geometrical entities and a data storage block storing the information on the numerical model, in particular, the geometrical entities of the numerical modeling the 3D domain.

FIG. 5 shows a prior art numerical model (M) of a 3D domain (Ω) comprising a plurality of geometrical entities (E) such a longitudinal borehole, planar fractures, faults and geobodies. With a big arrow, a sample view of certain region of the domain (Ω) is represented in the upper left side of the figure. All the geometrical entities (E) are stored in a data storage block (DB) represented in the right side of FIG. 5 a list of entities (E), The length of each record of the data storage block (DB) may be different as each record may comprise different information depending on the type of entity (E).

Each record of the data storage block (DB) at least comprises a first index key (K1) identifying the geometrical entity (E) and the coordinates (CD) of the location of the geometrical entity (E) or coordinates (CD) of the locations of part of the geometrical entity (E).

According to the prior art, a common operation such as determining collisions between at least a first set of geometrical entities (E) and a second set of geometrical entities (E) requires a sequential comparison of each geometrical entity (E) of the first set of geometrical entities (E) with all records of the data storage block (DB) in order to identify if each record being read is a geometrical entity (E) of the second set of geometrical entities (E) or if the location according to its coordinates determine a collision.

This long process is due to the irregular shape of the geometrical entities (E) and because the location within the data storage block (DB) does not correspond to the location within the domain (Ω).

Figure 6:
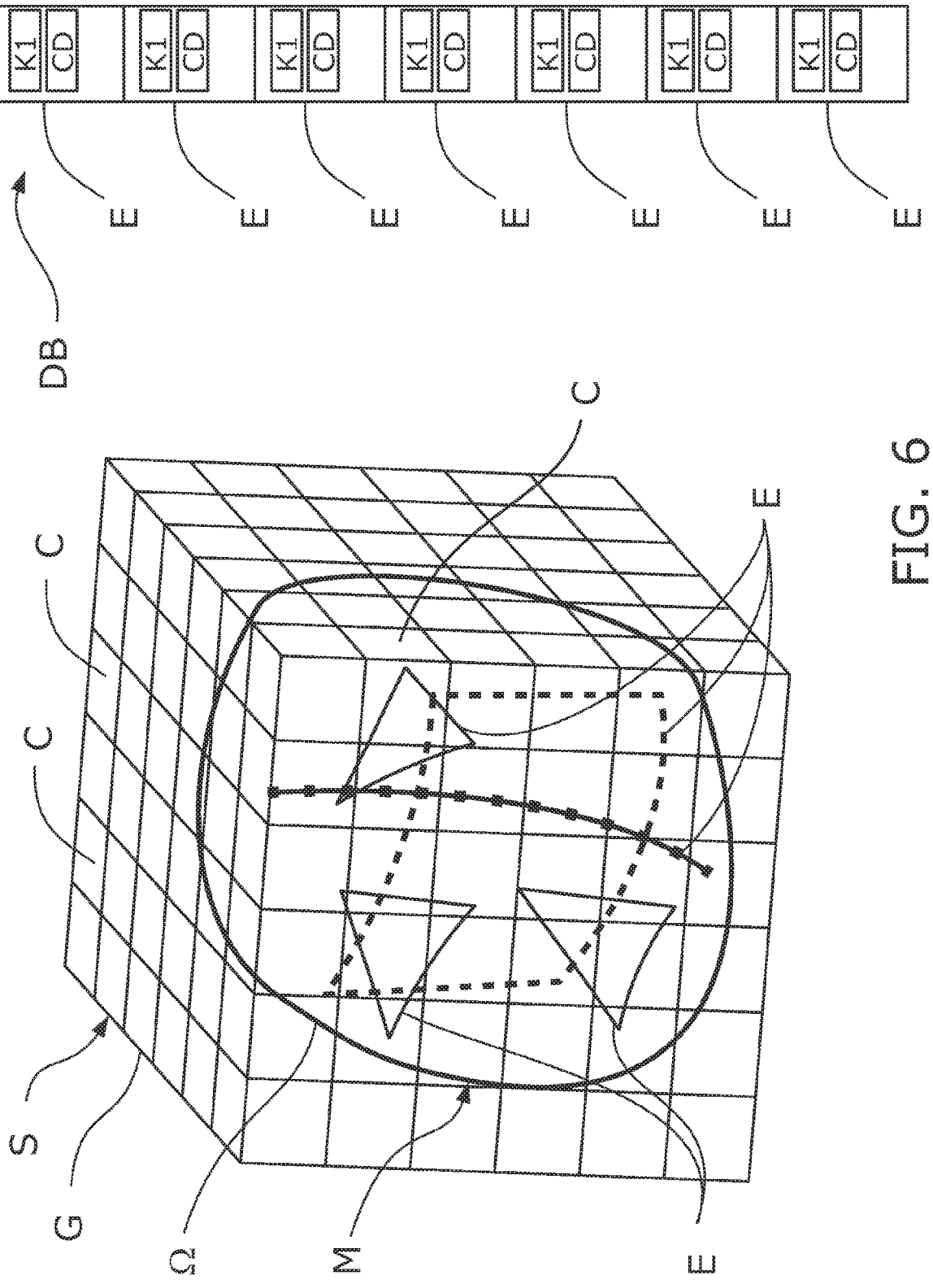
FIG. 6 This figure shows a schematic representation of some steps of the method according to an embodiment of the invention wherein a grid over a space comprising the domain allows the discretization of said domain.

As it is shown in FIGS. 5 and 6, according to the invention, this problem is solved by providing a list of first records (R1) allowing a fast access to the geometrical entities (E) located at certain region without the need of reading the entire data storage block (DB).

FIG. 6 shows the same elements depicted in FIG. 5 and a grid (G), in this embodiment a Cartesian structured grid, discretizing at least a space (S) including the domain (Ω) of the numerical model (M). That is, the domain (Ω) is completely housed within the discretized space (S) of the grid (G).

The method also works if the grid (G) is non-structured if each cell of the grid is indexed but structured grids provides a faster processing of the data storage block (DB) for determining the list (L) of first records (R1).

Non-Cartesian structured grids (G) allows to concentrate small cells in those regions having many geometrical entities (E) reducing the length of the lists (L) associated to the cells (C) allowing to adapt the number of fist records in said lists (L) providing an homogeneous length of all the lists (L).

In many cases of structured grids (G) and in all cases of Cartesian structured grids (G), the grid may be defined mathematically and therefore there is no need of storing the nodes and cells for determining the grid (G). That is, it may be a "virtual" grid (G).

Once the grid (G) has been determined, each geometrical entity (E) is housed or partially housed in one or more cells (C) of the grid (G). For a particular cell (C), one or more geometrical entities (E) are housed or partially housed in said cell (C).

Figure 7:
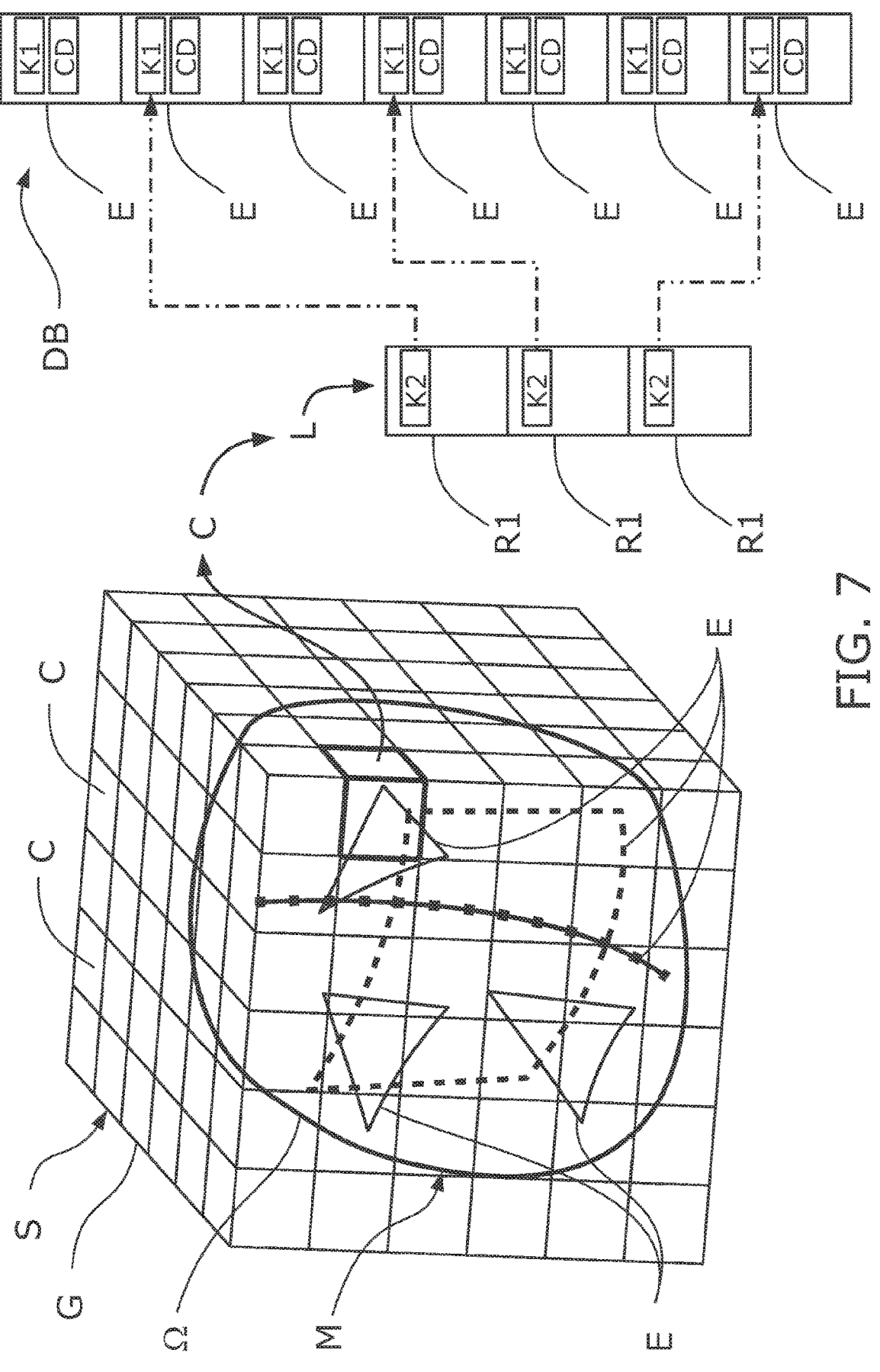
FIG. 7 This figure shows a schematic representation of the same embodiments and a schematic representation of one of the lists (L) involved in the indexing process of the method.

The method according to the invention, as it is shown in FIG. 7, for each cell (C) of the grid (G) generates a list (L) of first records (R1) wherein each record identifies a geometrical entity (E) being housed or partially housed in said cell (C).

Using the field data of the records of the data storage block (DB) storing the coordinates of the geometrical entity (E) or part of the geometrical entity (E), for each cell (C) the list (L) is generated by reading the entire data storage block (DB).

During this reading of the records of the data storage block (DB) if the record comprises an entity (E) having at least the coordinates (CD) of the location of the geometrical entity (E) or the coordinates (CD) of the locations of part of the geometrical entity (E) located within the cell (C) then a new first record (R1) is appended to the list (L), this new first record (R1) comprising at least a second index key (K2) field storing the first index key (K1) of the geometrical entity (E) being identify as the one having the coordinates (CD) or part of it having the coordinates (CD) located within the cell (C).

After this process, if a cell (C) does not house any geometrical entity (E) then the list (L) is empty. If the cell (C) houses or partially houses one or more geometrical entities (E) then the list (L) comprises one or more first records (R1), one per geometrical entity (E) being housed or partially housed, each first record (R1) allowing a direct access to the corresponding geometrical entity (E).

In this embodiment, each cell (C) of the Cartesian structured grid (G) may be indexed as G[i,j,k] being i, j, and k indexes with a predetermined range allowing to identify each cell (C) in the 3D space (S).

According to a particular embodiment, G[i,j,k] is a matrix of pointers to a list (L) of first records (R1), storing the "NIL" (also referred as "NULL" or "NAN" —Not a Number—for an empty pointer) value if the list is empty or a pointer to the first element of the list (L) if said list comprises at least one first record (R1).

If a pointer is represented by the symbol "^" and, if "r" is the index identifying elements within a list (L), the G[i,j,k]^[r] would be the r-th geometrical entity (E) housed or partially housed in the cell (C) identified by G[i,j,k] being therefore the set of lists (L) indexed according to the index of the grid (G).

The access to the geometrical entities (E) housed or partially housed in a predetermined cell (C) and stored in the data storage block (DB) is very fast as it is shown in FIG. 7. The cell (C) has a list (L) of first records (R1), each record comprising a second index key (K2). The second index key (K2) of each first record (R1) provides the index position of the geometrical entity (E) in the data storage block (DB) allowing the direct access without the need of reading the entire length of the data storage block (DB).

Even if the data storage block (DB) is being represented by a sequential arrangement of geometrical entities (E), the invention applies also to other complex structures as tree structures or octrees, wherein each element of the complex structure may be directly accessed by a first index key (K1).

Once the geometrical entity (E) has been accessed by the second index key (K2) of he list (L), the rest of data fields may be retrieved from the data storage block (DB).

According to another embodiment, the data storage block (DB) is being stored using an XML structured language.

An efficient method for generating the set of list (L) for each cell (C) of the grid is by a preprocessing method sequentially reading the data storage (DB), only once, according to the following steps:

for each cell (C) of the grid (G) generating a null list, for instance assigning the "NILL" value to the G[i,j,k] pointer;

sequentially reading geometrical entities (E) of the data storage block (DB) and, for each geometrical entity (E) read in the storage block (DB) having the coordinates (CD) of the location of the geometrical entity (E) or the coordinates (CD) of the locations of part of the geometrical entity (E) located within one or more cells (C), a new first record (R1) is appended to the list (L) of the each one or more cells (C), said new first record (R1) with the second index key (K2) of the new first record (R1) storing the first index key (K1) of the geometrical entity (E);

making available the set of lists (L) of first records (R1) comprising a second index key (K2).

Any of the former disclosed methods allows a fast processing for a set of geometrical entities (E) provided a bounded region of the geophysical domain (Ω). Said bounded region of the 3D domain (Ω) defines a sub-set of cells (C) housing said region, therefore, the data storage block (DB) is limited to those geometrical entities (E) being indexed by the lists (L) of the sub-set of cells (C) and, the access to those geometrical entities (E) is direct by means of the second index key (K2). That is, the speed of access is being highly increased because all the geometrical entities (E) not being housed in the sub-set of cells (C) are not managed and, because the access to any of the geometrical entity is directly accessed once the cell (C) it is housed or partially housed is known.

The relationship determined by the lists (L) is between the cell (C) and the geometrical entities (E) housed or partially housed in said cell (C). According to another embodiment, the data storage block (DB) is enriched with a second list (L2) in each record of a geometrical entity (E) allowing the relationship between each geometrical entity (E) and the cells (C) of the grid (G) housing said geometrical entity (E).

Figure 8:
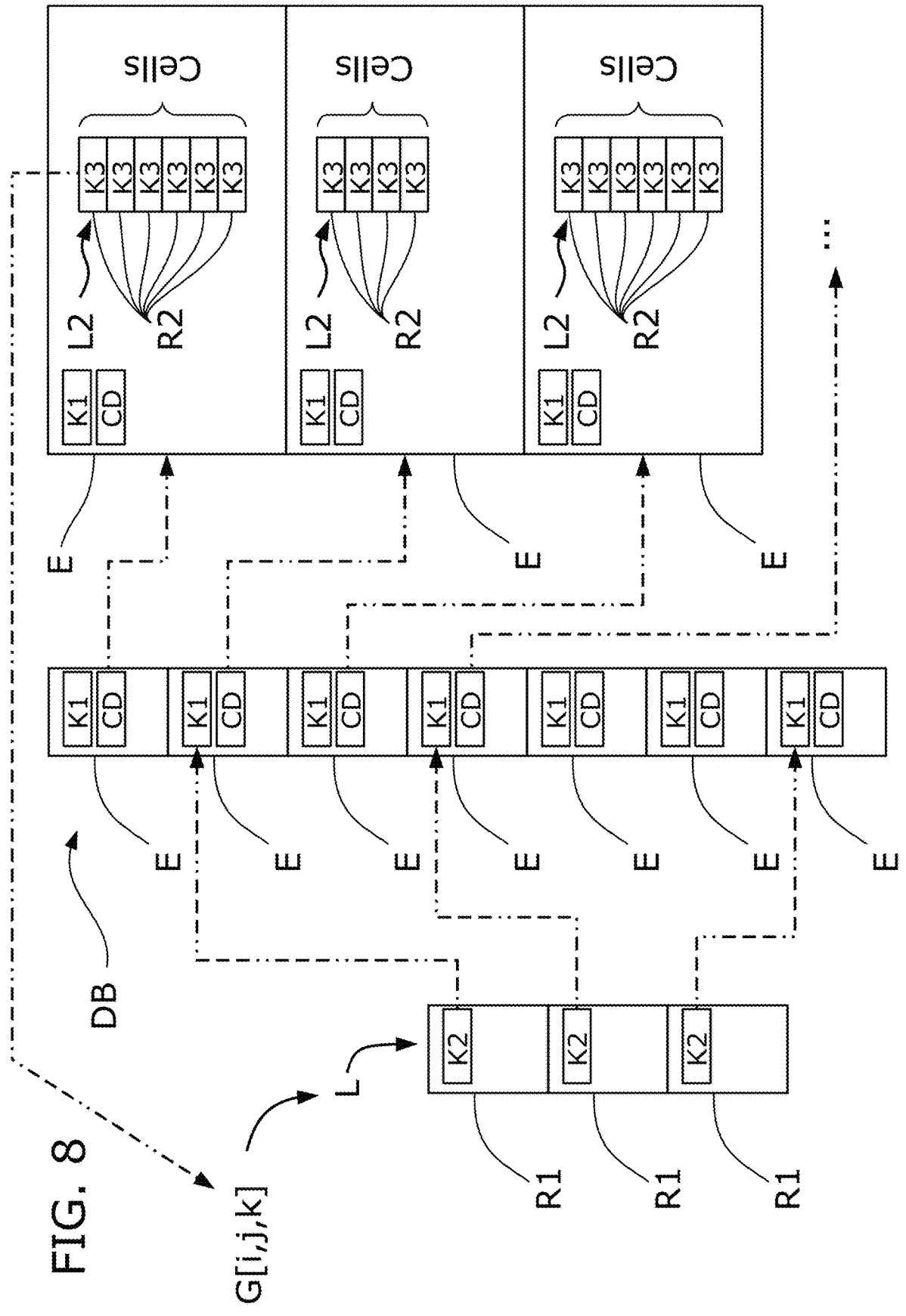
FIG. 8 This figure shows a schematic representation of an embodiment wherein the data base is expanded by adding additional information in each record identifying the cells housing the geometrical entity.

This second relationship, for a predetermined geometrical entity (E) or a set of geometrical entities (E), allows determining a subset of cells (C) completely housing the geometrical entity (E) or the set of geometrical entities (E) avoiding the management of the rest of cells (C) and, as a result, of the geometrical entities (E) being not housed in said subset of cells (C). That is, this enriched data storage block (DB) comprises information in the form of a second list (L2) per record allowing to avoid to check the entire data storage block (DB) when making operations on a predetermined geometrical entity (e) or a set of geometrical entities (E). As it is shown in FIG. 8, the post processing method departs from a data storage block (DB) and a new data structure indexed by the index of the cells (C), for instance G[i,j,k], comprising a list (L) per cell (C) according to any of the previously disclosed embodiments of the method.

This post processing method comprises the following steps:

for each geometrical entity (E) stored in the data storage block (DB) appending a second list (L2) to said geometrical entity (E), the second list (L2) comprising second records (R2) being associated to cells (C), the second records (R2) comprising at least a third index key (K3) wherein:

the second list (L2) comprises a second record (R2) for each cell (C) satisfying that the coordinates (CD) of the location of the geometrical entity (E) or the coordinates (CD) of the locations of part of the geometrical entity (E) are located within said cell (C) and, the third index key (K3) of each second record (R2) stores an index of the cell (C), for instance the set of indexes i, j and k; according to the previous condition; that is, the location of the geometrical entity (E) or the coordinates (CD) of the locations of part of the geometrical entity (E) are located within the cell (C).

FIG. 8 shows at the right the enriched data storage block (DB) wherein each record of said data storage block (DB) comprises a second list (L2) with second records (R2) comprising a third index key (K3) identifying the cells (C) housing the geometrical entity (E).

At the top of FIG. 8, a long arrow links a third index key (K3) with the cell (C) said third index key (K3) is aiming to providing the identified second relationship.

According to any of the previous disclosed embodiments of the method a sub-set of geometrical entities (E) may be manipulated by the following steps:

selecting the cells (C) comprising the geometrical entities (E) to be manipulated, for instance by means of the second list (L2) and;

accessing to the geometrical entities (E) of the sub-set of geometrical entities (E) by means of the second index keys (K2) contained in the lists (L) of the selected cells (C).

Any of the management operations over geometrical entities (E) may comprise at least reading and writing operations.

In particular, determining collisions between at least a first set of geometrical entities (E) and a second set of geometrical entities (E) can be determined in an efficient manner, using the methods disclosed and the data structures generated, according to the following steps:

i. selecting the cells (C) containing the first set of geometrical entities (E);

ii. selecting the cells (C) containing the second set of geometrical entities (E);

iii. determining the set of cells (C) being the union between the set of first selected cells (C) and the set of second selected cells (C);

iv. for each cell (C) of the set of cells (C) determined in step iii), computing collisions between the geometrical entities indexed in the second index key (K2) in the list (L) associated to said cell (C).

The union operation takes into account any cell (C) only once eliminating repeated cells (C). The number of cells (C) is reduced when compared to the cells (C) of the grid (G) and therefore the number of geometrical entities (E) is only a sub-set among the total amount of geometrical entities (E). Additionally, the second index keys (K2) provides a direct access to any of the entities (E).

Any of the methods disclosed above may be provided in the form of a computer program product comprising instructions which, when the program is executed by a computer, cause the computer to perform said methods.

A third aspect of the invention is the data structure generated by any of the former disclosed methods, In particular the data structure comprising: a data storage block(DB) comprising a plurality of geometrical entities (E) of a numerical model (M) wherein said geometrical entities (E) at least comprise:

a first index key (K1) identifying the geometrical entity (E), coordinates (CD) of the location of the geometrical entity (E) or coordinates (CD) of the locations of part of the geometrical entity (E);

a set of lists (L), each list (L) comprising at least one second key (K2) identifying geometrical entities (E) of the data storage block (DB) wherein each first index key (K1) is at least stored in a second key (K2) of at least one list (L).

According to another embodiment, in this data storage block (DB), the set of lists (L) comprising second keys (K2) are defined by determining a grid (G) comprising cells (C), said grid (G) discretizing at least an space (5) including the domain (0) of the numerical model (M) wherein each cell (C) is associated to a list (L) of second index keys (K2) wherein each second index key (K2) is the first index key (K1) of a geometrical entity (E) having at least the coordinates (CD) of one location located within the cell (C) or the first index key (K1) of a geometrical entity (E) having at least the coordinates (CD) of the locations of part of the entity (E) located within the cell (C).

According to another embodiment, in any of the former two data structures, the first index keys (K1) are being accessed by a tree structure.

According to another embodiment, in any of the former data structures, each list (L) of the set of list (L) is indexed with the same index identifying the corresponding cell (C) of the grid (G).

In any of the former embodiments, the 3D domain may be enlarged increasing the complexity of the numerical model (M). The disclosed methods and the disclosed data structures has the advantage of allowing said enlargements. In this case, the space (5) is enlarged in such a way the enlarged 3D domain (Q) is housed in the new space (5) and, the grid (G) is also enlarged discretizing the extra space (S).

The extra space (S) generates new cells (C) allowing to identify the former cells (C) and the new generated cells (C). The former cells (C) already have the list (L) of geometrical entities (E) being housed or partially housed in the cell (C). Said lists (L) are valid because the new generated cells (C) are disjoint cells (C), therefore, the list (L) of geometrical entities (E) being housed or partially housed in the new generated cells (C) are generated only for those new generated cells (C). The same applies to the post-processing method wherein the enrichment of the records of the new data storage block (DB) containing new geometrical entities (E) is applied to those new geometrical entities (E) and, only if new geometrical entities (E) invade former cells (C), then the list (L) of those cells (C) are updated adding new first records (R1), one new first record (R1) per new geometrical entity (E) invading the cell (C).

The invention claimed is:

1. A method for configuring and using a data storage and retrieval system to simulate the behavior of a physical 3D reservoir domain having geometrical entities contained therein, the physical 3D reservoir domain being represented by a numerical model instantiated in a computer memory by a data structure of the data storage and retrieval system, the method comprising the steps of:

using field data acquired from the reservoir domain, creating in the computer memory a data storage block having a list of records, each record storing data relating to a geometrical entity in the reservoir domain, the data including a first index key and coordinates of a location of the geometrical entity in the reservoir domain or coordinates of locations in the reservoir domain that include at least part of the geometrical entity;

defining a grid by discretizing a space containing the 3D reservoir domain of the numerical model into a plurality of cells, such that each point of space of the numerical model is associated to a cell of the grid, and each geometrical entity is associated with the one or more of the plurality of cells in which the geometrical entity, in whole or in part, is located;

for each of the plurality of cells in the grid, creating in the computer memory a list of first records appended to the data storage block, wherein creating the list of first records includes:

generating a null list for each cell of the grid; and sequentially reading, only once, each record in the list of records stored in the data storage block to determine in which cell(s) of the grid each geometrical entity is located, and based on the determined location for each geometrical entity, for each of the plurality of cells in the grid, generating a list of first records, wherein each first record of a list identifies a geometrical entity, which in whole or in part, is located in the cell associated with the list and includes at least a second index key that stores the first index key of the identified geometrical entity, and executing, via a computer system, a simulation operation of the numerical model using data relating one or more geometrical entities in the reservoir domain, the data accessed via the second index keys.

2. The method according to claim 1, wherein when a cell of the grid contains no geometrical entity, the list of first records for that cell is empty, and when a cell of the grid contains in whole or in part one or more geometrical entities, the list of first records for that cell includes a corresponding number of first records such that there is one first record for each geometrical entity identified in that cell, and wherein each first record allows direct access to the corresponding geometrical entity.

3. The method according to claim 2, wherein the structured grid is a Cartesian structured grid.

4. The method according to claim 2, wherein the grid is indexed and a set of lists are indexed according to the index of the grid.

5. The method according to claim 1, wherein the grid is a structured grid.

6. The method according to claim 1, wherein the first index key identifying each geometrical entity is indexed by a tree structure.

7. The method according to claim 1, wherein a post-processing method is carried out according to the following steps:

for each geometrical entity stored in the data storage block, appending to each geometrical entity a list of second records having at least a third index key wherein:

the list of second records includes a second record for each cell of the grid satisfying that the coordinates of the location of the geometrical entity or the coordinates of the locations of part of the geometrical entity are located within the cell, and the third index key of each second record stores an index of the cell according to the previous condition.

8. The method according to claim 1, wherein a sub-set of geometrical entities of the numerical model are manipulated using manipulating operations according to the following steps:

selecting one or more cells that include the geometrical entities to be manipulated;

accessing the geometrical entities of the sub-set of geometrical entities by the second index keys contained in the list of second records for the selected cells.

9. The method according to claim 8, wherein the manipulating operations are at least reading and writing.

10. The method according to claim 8, wherein collisions between at least a first set of geometrical entities of the geometrical entities and a second set of geometrical entities of the geometrical entities are determined according to the following steps:

i. selecting one or more cells containing the first set of geometrical entities;

ii. selecting one or more cells containing the second set of geometrical entities;

iii. determining a set of cells being a union between the set of first selected cells and the set of second selected cells; and iv. for each cell of the set of cells determined in step iii), computing collisions between the geometrical entities indexed in the second index key in the list associated to that cell.

11. A non-transitory computer program product stored on a computer-readable medium and comprising computer-implementable instructions which, when executed by a computer, cause the computer to carry out the method according to claim 1.

\* \* \* \* \*